G. E. & J. H. BURDICK.
ICE CLEANING MEANS FOR ICE WAGONS.
APPLICATION FILED OCT. 3, 1910.

983,346.

Patented Feb. 7, 1911.

WITNESSES:
C. H. Bills.
E. E. Thomas.

INVENTOR.
George E. Burdick,
James H. Burdick,
By Owen & Owen,
Their attys.

UNITED STATES PATENT OFFICE.

GEORGE E. BURDICK, OF COLDWATER, AND JAMES H. BURDICK, OF QUINCY, MICHIGAN.

ICE-CLEANING MEANS FOR ICE-WAGONS.

983,346.

Specification of Letters Patent. Patented Feb. 7, 1911.

Application filed October 3, 1910. Serial No. 585,090.

*To all whom it may concern:*

Be it known that we, GEORGE E. BURDICK, a resident of Coldwater, in the county of Branch and State of Michigan, and JAMES H. BURDICK, a resident of Quincy, in the county of Branch and State of Michigan, both citizens of the United States, have invented a certain new and useful Ice-Cleaning Means for Ice-Wagons; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to portable liquid discharging means; and it has for its object the provision, in combination with an ice wagon, of means for carrying water, or other suitable cleansing liquid, under pressure to be used as desired for cleaning ice preparatory to carrying it into a house, store or the like, thus saving the time, labor, and annoyance incident to carrying the ice to a hydrant of other suitable place for cleaning, or carrying water from a distant point for such purpose.

Our invention is fully described in the following specification and while in its broader aspect it is capable of embodiment in numerous forms a preferred embodiment thereof is illustated in the accompanying drawings, in which,—

Figure 1:
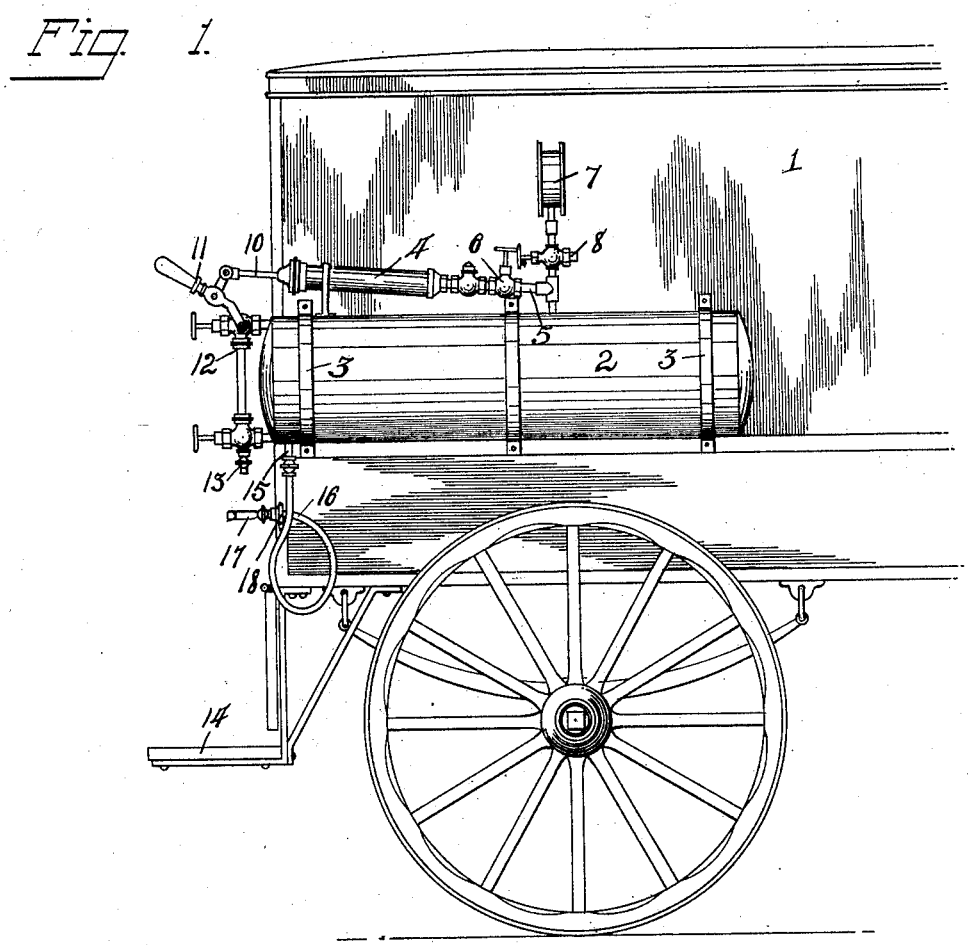
Figure 2:
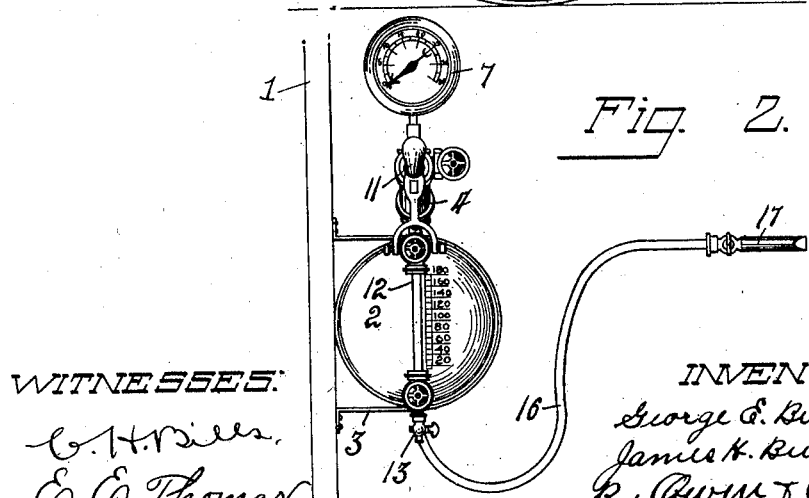

Figure 1 is a side elevation of a portion of an ice wagon with our invention associated therewith, and Fig. 2 is a rear end view of the parts comprising the invention.

Referring to the drawings, 1 designates an ice wagon and 2 a liquid holding tank, which is shown in the present instance, as being secured to the side of a wagon body adjacent the rear end thereof, but may be carried in any other suitable manner or position by the wagon as desired. The tank 2, while it may be of any desired size, is preferably of a sufficient size to enable it to carry a sufficient quantity of water to clean a wagon-load of ice.

The tank 2 is air tight and has air pumped thereinto to place the liquid under pressure by a suitable air pump 4, which is shown as being mounted on top of the tank and as having its air discharging end in communication with the tank through a pipe 5 having a valve 6 therein. The pipe 5 is also shown as having a branch leading therefrom to a pressure gage 7, and such branch may be provided with a valved nipple 8 for the attaching of a tank filling-hose. The plunger-rod 10 of the air pump is connected at its outer end to a lever handle 11, which is fulcrumed to the upper end of a sight gage 12, which gage is disposed at the rear end of the tank, as shown. This gage has the usual valve controlled connections at its upper and lower ends with the upper and lower portions of the tank as shown and has a bleed-cock 13 at its lower end. It is thus apparent that the pump lever 11 is disposed in convenient position to be operated by a person standing on the rear step 14 of the wagon.

A valved nipple 15 projects from the lower rear portion of the tank and has a hose 16 attached thereto which hose is provided at its discharge end with a suitable nozzle 17 for directing a thin stream of water suitable for cleaning ice. When not in use the hose is engaged with a hook 18 secured to the rear end portion of the wagon body to hold the hose and its nozzle against swinging movements.

A pound scale is provided at the side of the sight gage 12 to enable the weight of the liquid contents of the tank to be easily determined, whereby to facilitate the weighing of a load of ice, the weight of the wagon and the water within the tank being known.

In the use of our invention, the tank 2 is filled with water before starting out with a load of ice and placed under pressure by pumping a desired amount of air thereinto. When a cake of ice is taken from the wagon it may be easily and quickly cleaned by simply disengaging the hose 16 from the hook 18 and opening the valves associated therewith to permit water to be discharged upon the ice from the nozzle 17. As the pressure within the tank becomes reduced by the discharge of water therefrom such pressure may be easily renewed by working the pump until the hand of the pressure gage shows the desired pressure.

It is found in practice that the use of our invention on ice wagons is of very great value as it lessens time and labor incident to the cleaning of ice to such an extent as to enable the use of the usual helper or one person on an ice wagon to be dispensed with. When it is understood that in cleaning ice it is frequently necessary to carry the same some distance to a hydrant or other water supply, or to go into basements to secure water for cleaning purposes, the value and merits of this invention for use on ice wagons will be appreciated.

We wish it understood that our invention is not limited to any specific construction or arrangement of the parts except in so far as such limitations are specified in the claim.

Having thus described our invention, what we claim as new and desire to secure by Letters Patent, is,—

The combination with an ice wagon, of a tank carried thereby for containing water under pressure, an air pump associated with the tank with its discharge end in communication with the tank interior, a lever handle attached to the plunger rod of the pump, a water gage associated with one end of the tank and serving as a fulcrum for said lever handle, and a hose in valve-controlled connection with the tank and having a nozzle provided with a restricted discharge opening.

In testimony whereof, we have hereunto signed our names to this specification in the presence of two subscribing witnesses.

GEORGE E. BURDICK.
JAMES H. BURDICK.

Witnesses:
CHAS. U. CHAMPION,
AVRON GREGORY.